3,533,873
METHOD FOR PREPARING REFRACTORY COMPOSITES

Roger E. Wilson, Silver Spring, Md., assignor to the United States of America as represented by the Secretary of the Navy
No Drawing. Filed Nov. 24, 1967, Ser. No. 685,290
Int. Cl. B32b 33/00
U.S. Cl. 156—249
9 Claims

ABSTRACT OF THE DISCLOSURE

A refractory composite prepared by flame-spraying a refractory material, such as alumina, onto a metal substrate, such that the formed refractory layer has its greatest porosity at the surface immediately in contact with the metal substrate, separating the refractory layer from the metal substrate and bonding the surface of greatest porosity to a secondary composite material.

BACKGROUND OF THE INVENTION

This invention relates to refractory containing composites suitable for use as construction materials in areas where severe conditions of temperature and abrasion are encountered. More particularly this invention relates to a method for providing a refractory-plastic composite which is useful in the construction of supersonic aircraft and missiles and which is especially useful for the construction of radomes for such supersonic aircraft.

Reinforced plastic has long been used in the aircraft industry as a material of contruction for vehicles designed to operate in the subsonic flight regime. Such plastics possess the desirable advantages of being light weight, relatively simple to fabricate and are generally characterized by good dielectric properties. Despite these advantages however, the advent of vehicles capable of supersonic flight have rendered such materials obsolete mainly because of their inabilities to withstand the high temperatures generated by aerodynamic heating and to their inabilities to withstand the severe erosive action of the natural elements, such as rain fall, which, during flight, impinge upon the surface at supersonic speeds.

To offset these disadvantages, the art at first applied coatings of rubber to the plastic surface to form plastic-rubber composites. While this expedient was generally adequate for aircraft performing at moderate speeds, it was found to be wholly inadequate for more advanced vehicles capable of even greater performance where the surfaces are subjected to even more severe conditions of thermal degradation and erosion.

It has long been known that refractories of ceramic compositions, such as alumina and the like, are capable of withstanding these extreme conditions. But such materials are difficult to fabricate, brittle, susceptible to thermal shock and are characterized by relatively high densities, which imposes unacceptable weight penalties on the vehicle.

The art then conceived that composites of a refractory bonded to a reinforced plastic might provide a material which would avoid most of the aforementioned disadvantages. However, no simple method for forming such a plastic-refractory composite was then available. The earliest of these types of composites were prepared by directly flame-spraying the refractory onto a suitable reinforced plastic. Due to the high temperatures of flame-spraying, however, approximating 300° F., the plastic tended to degrade and the resultant composites were characterized by a relatively weak inter-layer bond. Moreover, plastic degradation severely limited the maximum obtainable tensile strength and thereby reduced still further the value of the composite as a material of construction.

One method for avoiding these difficulties and providing an adequate refractory-plastic composite is taught by Francis J. Koubek in U.S. Pat. 3,179,531, issued Apr. 20, 1965. According to this technique, refractory particles are embedded into the plastic to provide a somewhat heat resistant protective coating onto which the refractory can be directly flame-sprayed. While this technique provided a solution to the problem, it was soon realized that it was at best only a partial solution, since significant portions of the outer surface of plastic continued to remain exposed to the high temperatures and hence continued to degrade. Other solutions were attempted, such as the addition of greater quantities of particles to the uncured surface, but this was equally unsatisfactory since the necessary condition for particle adhesion is that at least a portion of the plastic seep around the individual particles to bond them to the plastic surface. This portion of the plastic continued to be subjected to the higher temperatures and continued to degrade.

A later technique for solving these problems is disclosed by Francis J. Koubek in U.S. patent application, Ser. No. 420,220, filed Dec. 21, 1964 now U.S. Pat. 3,364,089, dated Jan. 16, 1968. According to this technique the refractory is not directly flame-sprayed onto a the plastic surface, but instead it is flame-sprayed onto a metal substarte to form a metal-refractory composite. The refractory layer of this composite is then pressed into the plastic to form a metal-refractory-plastic triple composite. The metal is separated from the composite by taking advantage of the fact that the inner-face bond between the refractory and metal is weaker than that between the refractory and plastic. This technique still presented certain disadvantages, for instance, the refractory could not be sintered since it was never isolated and neither the metal substrate nor the plastic composition can withstand sintering temperatures. Hence the refractory layer was substantially weaker in strength characteristics then was desirable for many aircraft construction problems. Furthermore, although the composite bond strength was adequate for most applications, it was found that in many instances greater strength properties were essential.

It was obvious that greater bond strengths could be achieved if the ceramic possessed a measurable degree of porosity. However, most ceramic forming processes were designed to achieve near zero porosity throughout the refractory layer in order to produce an object of high strength and low water permeability. In those processes which did provide a porous refractory, porosity was induced by incorporating particles of oxidizable or volatile materials into the refractory before forming. This resulted in pores being distributed throughout the entire refractory layer rather than only on one surface, thus losing the advantages of high strength and low water permeability.

SUMMARY OF THE INVENTION

It is therefore an object of this invention to provide a material suitable for use in the construction of supersonic aircraft and missiles.

It is also an object of this invention to provide a high strength material which has erosion and thermal resistance superior to that of prior art materials.

It is further an object of this invention to provide a method for preparing the aforesaid construction material.

Another object is to provide a method for preparing a refractory-plastic composite which has excellent bond strength at its adjoining substrates.

Another object is to provide a composite material of relatively low porosity but which is highly porous at one surface.

Another object is to provide a method for preparing refractory-plastic composites whereby the refractory layer can be sintered to provide maximum intra-particle bonding.

In accordance with the invention these and other objects are attained by a method generally comprising flame-spraying a refractory material onto a metal substrate such that its maximum porosity occurs at the surface in immediate contact with the metal substrate, removing the refractory layer and bonding it to a secondary material, for example a plastic laminate, such that the surface of maximum porosity is in contact with the secondary material. In another aspect of this invention, removal of the refractory layer from the metal substrate is accomplished by merely cooling the composite and allowing the difference in thermal contraction between the metal and the refractory to create sufficient external stresses to cause self separation. In a still further aspect of this invention, the refractory layer is sintered and cooled prior to being contacted with the secondary material.

DESCRIPTION OF THE PREFERRED EMBODIMENTS

This invention has been predicated partially on the unexpected finding that a refractory layer formed by the flame-spray process is relatively porous and that its porosity is greatest in the region immediately adjacent to the metal substrate. While it is not completely understood why this condition should occur, it is believed that it is somehow related to the quenching effect of the higher thermal conductivity metal on the initial amounts of flame-sprayed refractory. This belief is based on the finding that the greater the difference between the thermal conductivity of the metal substrate and that of the refractory material, the greater is the porosity of the refractory in its initial layers.

This invention is further predicated upon the finding that if a metal substrate is selected so that its coefficient of expansion is substantially higher than that of the refractory material, the refractory layer can be removed intact prior to its being bonded to a secondary material. When the materials of the composite are so selected, separation is accomplished by merely cooling the combination and permitting the stresses created by the difference in thermal contraction to force the refractory layer from the substrate. To best accomplish this effect, it is preferred that the coefficient of expansion of the material be at least 25% higher than that of the refractory. Most preferred however are substrates which have coefficients of expansion at least 50% higher than the refractory.

After separation, the composite can be formed by firmly bonding the porous surface of the refractory layer to the secondary material.

The term "refractory materials" used herein is intended to define the well known refractory oxides, silicides, carbides and borides, such as alumina, spinel, silica, chromium oxide, silicone carbide, zirconia, beryllia, aluminum boride, silicon boride and the like. Most preferred, however, because of its hardness and refractoriness, is alumina.

The metal substrate, also known as the "mandrel," must not only meet the aforementioned criteria concerning the coefficient of expansion, but it should also be resistant to warpage at the extreme temperatures provided during flame-spraying. Particularly good results are obtainable when the metal substrate is formed from aluminum or the copper base alloys, such as brass and the like. The metal substrate may be in any shape that does not have an undercut section which might prevent removal of the refractory layer. Otherwise there appears to be no limit on size or shape. For best results, the mandrel should be preheated up to temperatures of about 150° F. before application of the refractory. When the mandrel is sufficiently hot, it is flame-sprayed with the refractory taking sufficient care that the temperature of the mandrel is never heated to the point at which it begins to warp or part from the refractory layer. When the desired thickness of refractory has been obtained, the combination is then permitted to cool. During cooling to room temperature, the refractory separates from the mandrel due to the large shear stresses built up at the interface.

Prior to the application of the refractory material, the metallic substrate may be roughened by grit-blasting the surface using approximately 45 p.s.i. pressure and holding the grit-blast approximately 12 inches from the surface. For best results, a silicone mold release agent should be applied to the roughened surface to facilitate the subsequent removal of the refractory. One type of silicone mold release which has been successfully used in the pretreatment of the brass substrate is trademarked IMS (abbreviation for Injection Mold Supply) and manufactured by the Injection Molders Supply Company of Cleveland, Ohio. By this technique, the mandrel may be continuously reused, a fact that is economically important for complex shapes.

The porous surface of the refractory layer is then contacted with the secondary composite material. While this invention has been principally disclosed with reference to plastic containing composites, it should be understood that any material can be cemented to the refractory layer and the porous surface will permit maximium bonding. For example, the refractory layer may be cemented by a suitable glue or cement to glass, metal, cardboard, etc. For aircraft and missile applications, however, it is desirable to bond the refractory layer to a laminated plastic structure of the art recognized type. Such laminated plastic structures may be formed of alternate layers of a resinous material and fiberglass. The resinous material employed must be heat resistant and the term "heat resistant material" is designed to mean a material selected from the class of polyester resins, phenolic resins, and epoxide resins. In one embodiment of this invention, the glass cloth laminate bonded to an alumina layer consisted of 25 plies of epoxy fiberglass laminate. Once such a laminated structure has been built-up to the desired thickness the hard refractory material is applied.

Optionally, to provide backing material with sufficient stiffness to support the refractory layer, the laminate may contain suitable fillers of the same refractory material which imparts to the laminate essentially the same modulus of elasticity as the refractory layer. The refractory is contacted with the uncured laminate with approximately 25 p.s.i. pressure applied normal to the refractory-laminate interface. This causes the uncured resin to be firmly embedded into the pores of the refractory structure so that subsequent heat curing at about 150° F., will provide hard fiberous links between the cement and the bonded faces.

One of the particular benefits of this invention is that the refractory layer can be sintered prior to its being combined with the secondary composite material. Sintering strengthens the refractory layer by creating stronger intra-particle bonds and hence the composite provided by this techniques is characterized by not only stronger inter-layer bonding but also greater overall strength characteristics. Sintering is accomplished by merely subjecting the refractory layer to temperatures of between 1000° F. and 3500° F. for periods of up to about 1 hour. When the refractory material is alumina, sintering has the particular advantage of altering the composition from the gamma form of alumina to the much harder alpha form. This transition occurs at about 1400° F. Having generally described the invention the following example is provided for purposes of illustration only and is not meant to be limiting in any manner.

EXAMPLE

A brass plate was machined flat and then lightly sand blasted to provide a small amount of surface abrasion. The sand blasted surface was then lightly sprayed with a silicone mold release agent, made by Injection Molder Supply Co. and then wiped with an absorbent wiping tissue. The alumina coating was applied with a standard oxygen-acetylene Mogul Type R–1 gun using 0.475 cm. Rokide A rods. Spraying was continued until the temperature of the metal substrate reached about 200° C. as measured with a surface thermometer attached to the brass substrate. After allowing the substrate to cool moderately, spraying was resumed until the substrate temperature again reached 200° C. This was repeated until a layer of 20 mils was obtained. The brass-alumina composite was then permitted to cool to room temperature. The refractory layer substantially separated from the metal substrate, and was then sintered at 2700° F. for ½ hour, cooled and contacted by its most porous face with a glass cloth reinforced Epon 1031 laminate having 25 plies of fiberglass cloth. 0.14 kg./cm.$^2$ pressure was applied normal to the interface and the composite was subjected to a cure temperature of 425° F.

Obviously many modifications and variations of the present invention are possible in light of the above teachings. It is therefore to be understood that the invention is only meant to be limited by the subsequent claims.

What is claimed as new and desired to be secured by Letters Patent of the United States is:

1. A method for providing a refractory composite which comprises:
   (a) flame-spraying a refractory material to the surface of a metal substrate wherein the coefficient of expansion of said metal substrate is sufficiently higher than that of said refractory layer such that by mutual cooling of the metal substrate-refractory layer combination, the difference in thermal contraction will result in separation of said refractory layer from said metal substrate thereby forming a refractory layer having its greatest porosity at the surface in contact with said metal substrate,
   (b) separating said refractory layer from said metal substrate,
   (c) bonding the surface of greatest porosity of said refractory layer to a secondary material and thereafter recovering a refractory composite.

2. The method of claim 1 wherein said refractory layer is bonded to a plastic material.

3. The method of claim 1 wherein said refractory layer is sintered at temperatures of up to about 3500° F. after removal from said metal substrate and prior to being bonded to said secondary material.

4. The method of claim 1 wherein the coefficient of expansion for said metal substrate is at least 25% higher than that for said refractory layer.

5. The method of claim 2 wherein said plastic material is a laminate composition comprising alternate layers of glass cloth and a heat resistant resin selected from the group consisting of epoxy resins, polyester resins and phenolic resins.

6. Method of claim 5 wherein said metallic substrate is selected from the group consisting of aluminum, copper and brass and said brass is maintained at a temperature of between 100° C. and 200° C. while said refractory material is flame-sprayed thereon and thereafter said brass-refractory combination is cooled to about room temperature so as to cause the refractory layer to separate from said brass substrate due to their difference in thermal contraction.

7. The method of claim 6 wherein said metal substrate is roughened and coated with silicone release agent prior to application of said refractory material.

8. The method of claim 6 wherein said refractory material is selected from the group consisting of refractory oxides carbides and borides.

9. The method of claim 8 wherein said refractory material is alumina.

References Cited

UNITED STATES PATENTS

| | | | |
|---|---|---|---|
| 3,336,873 | 8/1967 | Wilford | 156—232 |
| 3,364,089 | 1/1968 | Koubek et al. | 156—232 |

REUBEN EPSTEIN, Primary Examiner

U.S. Cl. X.R.

156—232; 161—185